United States Patent [19]

Kaspar

[11] 4,295,071
[45] Oct. 13, 1981

[54] LATTICE BAR FOR ELECTRICAL MACHINERY

[75] Inventor: Ernst Kaspar, Birr, Switzerland

[73] Assignee: BBC Brown, Boveri & Company Limited, Baden, Switzerland

[21] Appl. No.: 27,408

[22] Filed: Apr. 5, 1979

[30] Foreign Application Priority Data

Apr. 6, 1978 [CH] Switzerland .................. 3691/78

[51] Int. Cl.³ ............................................ H02K 3/14
[52] U.S. Cl. ................................ 310/213; 174/34; 336/187
[58] Field of Search .............. 310/213, 201; 174/34; 336/187

[56] References Cited

U.S. PATENT DOCUMENTS

| 2,872,501 | 2/1959 | McMahon | 174/34 |
| 2,886,628 | 5/1959 | Doherty | 174/34 |
| 3,614,497 | 10/1971 | Brenner | 310/213 |
| 3,976,904 | 8/1976 | Leistner | 310/213 |

FOREIGN PATENT DOCUMENTS

| 228324 | 7/1963 | Austria | 310/213 |
| 612212 | 3/1935 | Fed. Rep. of Germany | 310/213 |
| 394109 | 6/1933 | United Kingdom | 310/213 |

Primary Examiner—R. Skudy
Attorney, Agent, or Firm—Burns, Doane, Swecker & Mathis

[57] ABSTRACT

The insulation requirements of a lattice bar for inhibiting glow discharges can be reduced by providing longitudinal notches in the bending portions of the flat spacing conductors in the lattice bar. The notches can be provided on one or both sides of the spacing conductors in dependence upon the degree of twist of the conductors in the lattice bar. The extent to which the notches extend across the spacing conductors can also be a function of the degree of twist.

7 Claims, 8 Drawing Figures

LATTICE BAR FOR ELECTRICAL MACHINERY

BACKGROUND OF THE INVENTION

The present invention relates to a lattice bar for electrical machinery having crossed or twisted spacing conductors which are made of copper and insulated from each other.

Insulated flat copper wires are predominantly used today in the construction of twisted bars for electrical machinery. The copper used to form the spacing conductor is straightened, cut into suitable lengths, bent to an angle in a specified manner and thereafter joined to the winding conductors which are to be spaced. Age-hardened layers of enamel, coverings made of glass fiber, polyester fiber, asbestos fiber or mixtures of the latter in combination with binding enamels or resins can be used as an insulator which covers the spacing conductors. Wrappings made of foils or fine mica strips having a thickness of 0.1 to 0.35 mm on both sides of the spacing conductor, as well as glued polyamide strips or strips made of other insulating materials can be used for the insulator as well.

These spacing conductor insulations must be firmly cemented to the copper forming the spacing conductor and have sufficient stability against bending stresses. An insulating material, commonly known as a sword and preferably made from mica, hard plastic or material similar to foil, is cemented between two rows of spacing conductors. The sword insulator has a thickness of about 0.3 mm and is used for additional insulation between the spacing conductors which cross one another. Furthermore, this insulator can supply at least some of the resin required for fastening the lattice bar if it is provided with a sufficiently hardenable binding agent.

An additional insulation is also provided on the crossing or bending points of the spacing conductors. At these crossing or bending points, square or diamond-shaped strips are inserted between the conductors. These strips must have a special mechanical stability and yet be flexible, in order to resist the shear stresses arising during the operation of the electrical machine. See, for example, the book, *Manufacture of Windings of Electrical Machinery* by H. Sequenz, Springer Verlag, Vienna, New York 1973, page 142, FIG. 83.

The fastening of the lattice bars to a conductor is performed in heated presses with the use of polyester or epoxy resins which harden in a time period of a few minutes to an hour when heated from 130° to 180° C. The required synthetic resin is spread on the outside of the lattice bar. In addition, or alternatively, the sword insulator material can release a sufficient quantity of prereacted resin to the individual spacing conductors from the inside of the lattice bar for fastening the conductors. A moldable material made of synthetic resins with suitable fillers or fine mica which is hardened during the baking process is spread onto the bending points on the sides of the conductor for filling in any irregularities.

One problem associated with the insulating strips which are used for the additional insulation of the bending points is that they can cause destructive glow discharges due to air inclusions which can be formed therein. For this reason, resins containing carbon black or graphite have been applied at the bending points in order to make the electrical field at these points more uniform. These resins are sufficiently smoothed before the high voltage insulation is ironed or wound onto the lattice bar (see the above-noted reference at pp. 155 and 156). These precautionary measures nevertheless do not always lead to the desired degree of success. Furthermore, the insertion of the insulating strips and the application of the mica protective agent require additional steps which inhibit automation of the manufacturing process.

It is therefore an object of the present invention to avoid these disadvantages and to provide a lattice bar for electrical machinery which provides improved internal glow protection and has a decreased manufacturing cost.

This as well as other objects are achieved according to the present invention by providing a notch on at least one flat side of the spacing conductor at the crossing or bending points of the spacing conductor. The notch extends approximately along an extension of a longitudinal edge of the spacing conductor over at least part of the crossing or bending point of the spacing conductor.

In a lattice bar designed according to the present invention, no additional insulating strips are required at the crossing or bending points of the spacing conductors. This eliminates the one manufacturing step which heretofore inhibited automation of the manufacturing process. In the case of a bar conductor with 2n partial conductors twisted by 360°, it was previously necessary to provide 4n crossing or bending points with insulating strips. For lattice bars with a higher degree of twist, the expenditure for insulating strips was correspondingly higher. Any distortion of the spacing conductor insulation on the bending point and/or on the spacing conductor lying thereupon which is caused by the edges of the spacing conductor running over or under the bending point according to the present invention will be insignificant. This further decreases considerably the expenditure required for internal glow discharge protection.

For lattice bars which are not twisted to such a degree, the sequentially arranged bending points, as viewed in the longitudinal direction of the bar, are located relatively far apart. In the case of these bars, it is sufficient to apply notches only to one flat side of the spacing conductor whereby the notch extends over the entire crossing or bending points of the conductor.

For lattice bars with a higher degree of twist, it is advisable to apply the notches on both sides of the spacing conductor whereby the notches extend over at least half of the length of the crossing or bending point. Preferably, both notches have a maximum depth on oppositely located sides of the crossing or bending points and become shallower toward the center of the spacing conductor.

The notch is prepared preferentially by cold working with a pressing tool which decreases the conductor cross sectional width to a slight extent at the bending point. Minimum notch depths of 0.3 mm are sufficient to achieve the desired objectives. The notch should preferably have a maximum depth which is not greater than 40% of the spacing conductor thickness.

The width of the notch preferably is between a minimum of 2 mm and a maximum equal to the width of the spacing conductor outside of the bending point. The transverse profile of the notch is preferentially semicylindrical in cross section with a rounded-off notch base and notch rim, to limit the effect of the notch on the electrical characteristics of the conductor.

DESCRIPTION

Figure 1A:
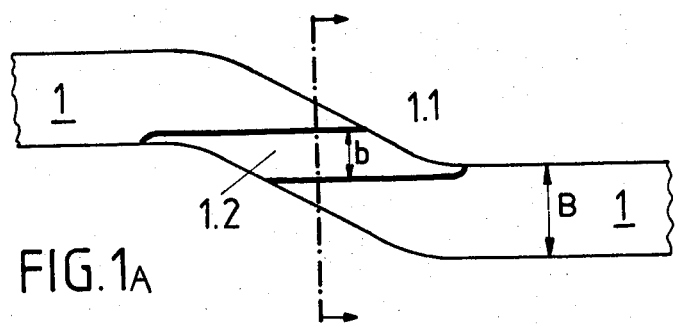
FIG. 1A is a top view and FIG. 1B is a cross section at the bending point of a spacing conductor with a one-sided notch.
Figure 1B:
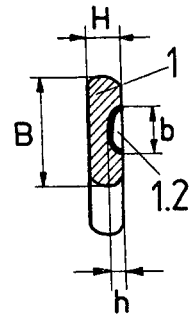

FIG. 1A illustrates a spacing conductor 1 with a bending point 1.1. In the cross section through bending point 1.1 shown in FIG. 1B, a flat side of the spacing conductor 1 is provided with a notch 1.2 having a semi-cylindrical profile with slightly rounded edges. The width b of the notch can be about 5 mm, and preferably has a maximum equal to the full spacing conductor width B. The depth h of the notch can be about 0.6 mm, and preferably has a maximum equal to 40% of the spacing conductor height H.

Figure 2A:
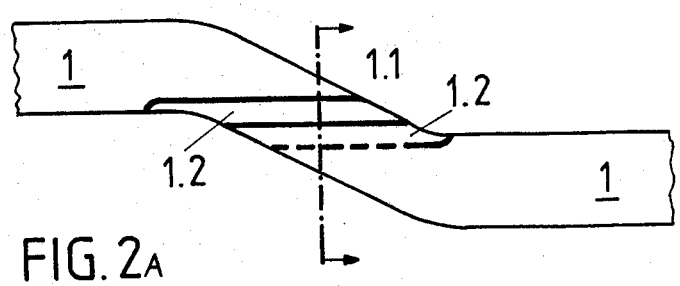
FIG. 2A is a top view and FIG. 2B is a cross section of a spacing conductor with notches on both flat sides.
Figure 2B:
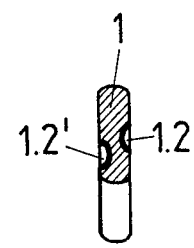

In FIGS. 2A and 2B, notches 1.2, 1.2' are provided on both flat sides of the spacing conductor and extend over the entire length of the bending point. Both notches are offset from each other in the transverse direction of the spacing conductor.

Figure 3A:
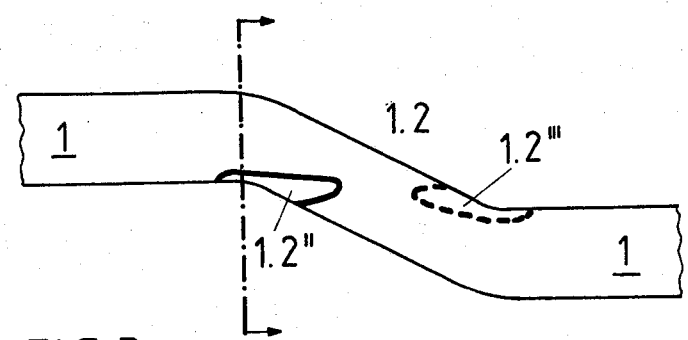
FIGS. 3A and 3B illustrate a modification of a spacing conductor according to FIGS. 2A and 2B with notches running out to the center of the bending point.
Figure 3B:
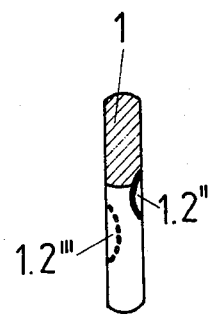

FIGS. 3A and 3B likewise illustrate a spacing conductor on which both flat sides are provided with notches 1.2" and 1.2'''. These notches are located diagonally with respect to each other. The depth of the notches decreases from the edges of the spacing conductor to the center.

A lattice bar constructed according to the embodiment of FIG. 1 is suitable for lattice bars having crossing or bending points which are located relatively far apart from each other. The embodiment according to FIG. 3 is more suited for lattice bars with a high degree of twist in which the crossing or bending points are located close to one another (i.e., the spacing length is less than three times the spacing conductor width B).

Figure 4:
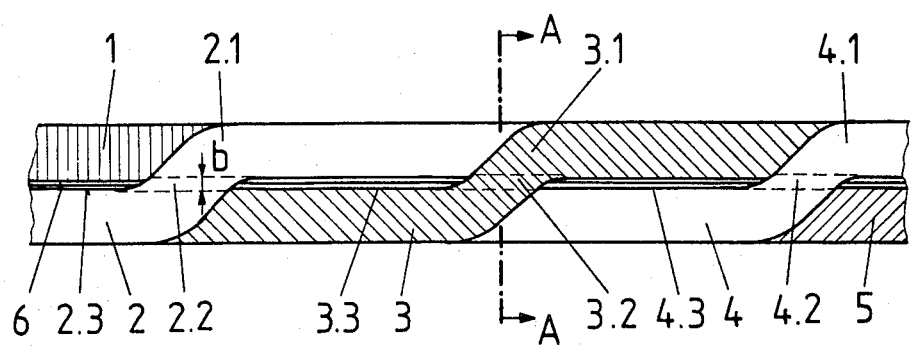
FIG. 4 is a top view of a bar conductor with twisted spacing conductors which are provided with notches at the bending points.

A top view of a lattice bar, commonly known as a Roebel bar, having twisted spacing conductors is illustrated in FIG. 4.

Figure 5:
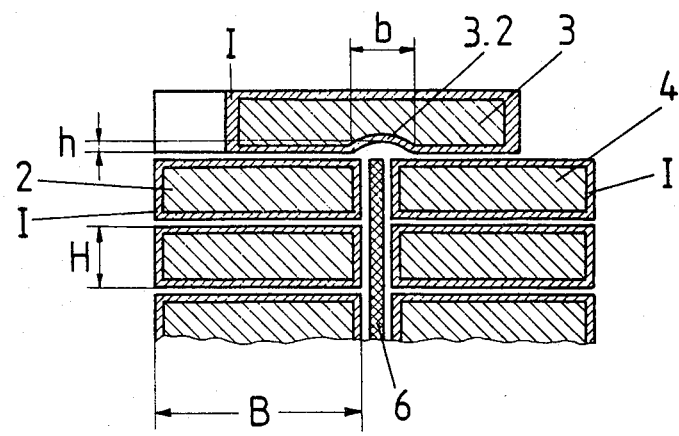
FIG. 5 is a vertical section on a magnified scale through the bar conductor according to the section lines A—A in FIG. 4.

A cross section through a lattice bar along the sectional line A—A is shown in magnified scale in the sectional view of FIG. 5 in which similar parts are provided with the same reference symbols. The spacing conductors 1, 2, 3, 4, 5 are provided with a spacing conductor insulation I (FIG. 5). For reasons of clarity, the individual spacing conductors are placed at a distance from each other and the spacing conductor insulation I and the notch 3.2 are depicted as oversized.

The spacing conductors have bends 2.1, 3.1 and 4.1. At these bending points, the location of the spacing conductors moves from one side to the other side of the lattice bar. An insulation inset, such as an insulation sword 6 (shown in FIG. 4 as a simple line), is arranged in the center between two spacing conductor rows. The undersides of the spacing conductors are provided at the bending points with notches 2.2, 3.2 and 4.2. These notches run in the longitudinal direction of the bar and lie along the extended edges 2.3, 3.3 and 4.3 of the spacing conductors. Their width b can be approximately between 2 and 5 mm and is preferably at most equal to the complete spacing conductor width B (FIG. 5). The depth h of the notches can be 0.6 mm and is preferably at most equal to 40% of the spacing conductor height H (FIG. 5). The notches are provided with rounded edges and a rounded notch bottom and can be produced by cold working. The placing of the notches can take place preferentially during the same procedure as the bending of the spacing conductors.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. In a lattice bar for electrical machinery comprised of a plurality of transposed flat copper conductors insulated from each other and having bending portions along their length, the improvement wherein a notch is provided in only one flat side of each transposed conductor, each notch extending approximately longitudinally of an extended edge of its respective transposed conductor over the entirety of the bending portion of the conductor.

2. In a lattice bar for electrical machinery comprised of a plurality of transposed flat copper conductors insulated from each other and having bending portions along their length, the improvement wherein notches are provided in both flat sides of each transposed conductor, each notch extending approximately longitudinally of an extended edge of its respective transposed conductor over at least half of the length of the bending portion of the conductor.

3. A lattice bar according to claim 2, wherein both notches have a maximum depth on oppositely located sides of the bending portion and become shallower toward the center of the bending portion.

4. A lattice bar according to claim 1 or 2, wherein the minimum depth of the notch is 0.3 mm.

5. A lattice bar according to claim 1 or 2, wherein the maximum depth of the notch is equal to 40% of the transposed conductor thickness.

6. A lattice bar according to claim 1 or 2, characterized in that the width of the notch is between 2 mm and a maximum equal to the width of the transposed conductor outside of the bending points.

7. A lattice bar according to claim 1 or 2, wherein the notch has slightly rounded edges and a rounded bottom.

* * * * *